United States Patent [19]
Taguchi

[11] 3,977,858
[45] Aug. 31, 1976

[54] APPARATUS FOR MEASURING A WIDTH OF A GLASS RIBBON IN PLATE GLASS MANUFACTURING

[75] Inventor: Chiaki Taguchi, Hisai, Japan

[73] Assignee: Central Glass Co., Ltd., Ube, Japan

[22] Filed: Nov. 19, 1974

[21] Appl. No.: 525,171

[30] Foreign Application Priority Data
Nov. 20, 1973 Japan.............................. 48-129680

[52] U.S. Cl..................................... 65/158; 65/29; 65/160; 65/163
[51] Int. Cl.²......................................... C03B 17/00
[58] Field of Search ............ 65/158, 160, 162, 163, 65/29

[56] References Cited
UNITED STATES PATENTS

| | | | |
|---|---|---|---|
| 3,482,954 | 12/1969 | Yuen ................................ | 65/158 X |
| 3,799,679 | 3/1974 | Simko ................................. | 356/200 |
| 3,849,099 | 11/1974 | Maltby, Jr. et al. .............. | 65/162 X |

*Primary Examiner*—Arthur D. Kellogg

[57] ABSTRACT

Two detecting means move in the direction perpendicular to that of the advancement of a glass ribbon while the glass ribbon is carried on a roller conveyor and stop upon detecting its side edges. Then the distance between the two detecting means, which corresponds to the width of the glass ribbon, is indicated in a form of an electrical signal.

2 Claims, 6 Drawing Figures

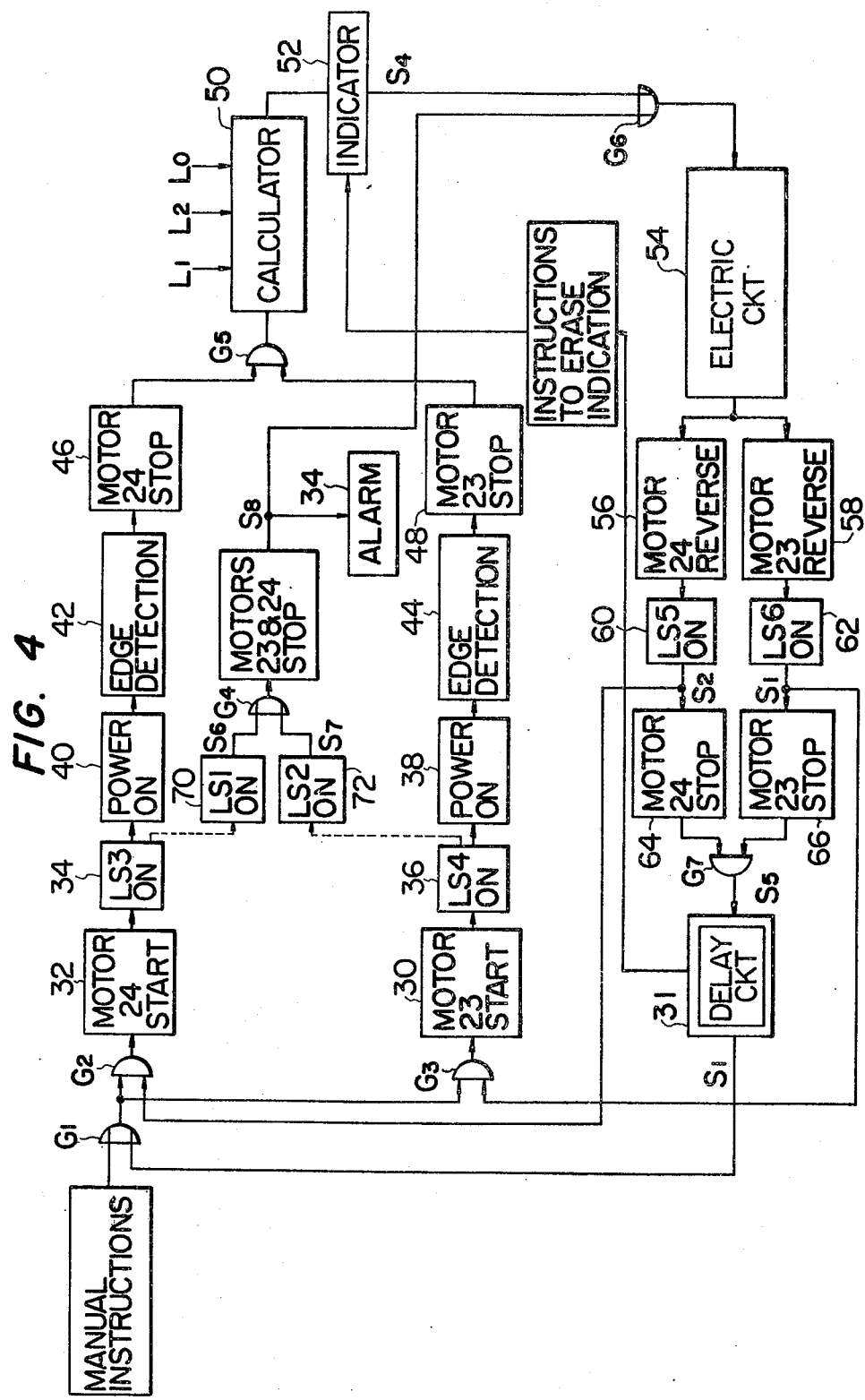

APPARATUS FOR MEASURING A WIDTH OF A GLASS RIBBON IN PLATE GLASS MANUFACTURING

This invention relates generally to an apparatus for use in plate glass manufacturing, and particularly to an apparatus for generating an electrical signal representing a width of a glass ribbon in plate glass manufacturing.

With respect to quality control and securing a high yield rate in plate glass manufacturing, it is very important to product a glass ribbon with a constant or predetermined width. Therefore, it is required to precisely measure the width of the glass ribbon. The present invention converns an apparatus to generate an electrical signal indicative of the width of the glass ribbon while it is carried on a roller conveyor, the apparatus comprising:

Two detecting means being movable in a horizontal plane parallel to the major surfaces of the glass ribbon and in the direction perpendicular to that of its advancement and adapted to detect its side edges, the two detecting means initially situated at positions out of the side edges respectively and then moving toward a vertical plane containing a center line of the roller conveyor to detect the side edges respectively:

Two moving means moving the two detecting means and stopping them when the two detecting means detect the side edges, respectively:

And signal generating means generating an electrical signal indicative of a distance between the two detecting means, so that the width of the glass ribbon can be represented by the electrical signal when the two detecting means are forced to stop upon detecting the side edges, respectively.

It is an object of the present invention to provide an improved apparatus for generating an electrical signal representing a width of a glass ribbon in plate glass manufacturing.

Other objects, features, and advantages of the present invention will become more apparent on reference to the succeeding detailed description thereof, and to the accompanying drawings illustrating the preferred embodiment thereof, wherein:

FIG. 4 illustrates schematically in a block diagram the operating process of the FIG. 1 apparatus.

Figure 1:
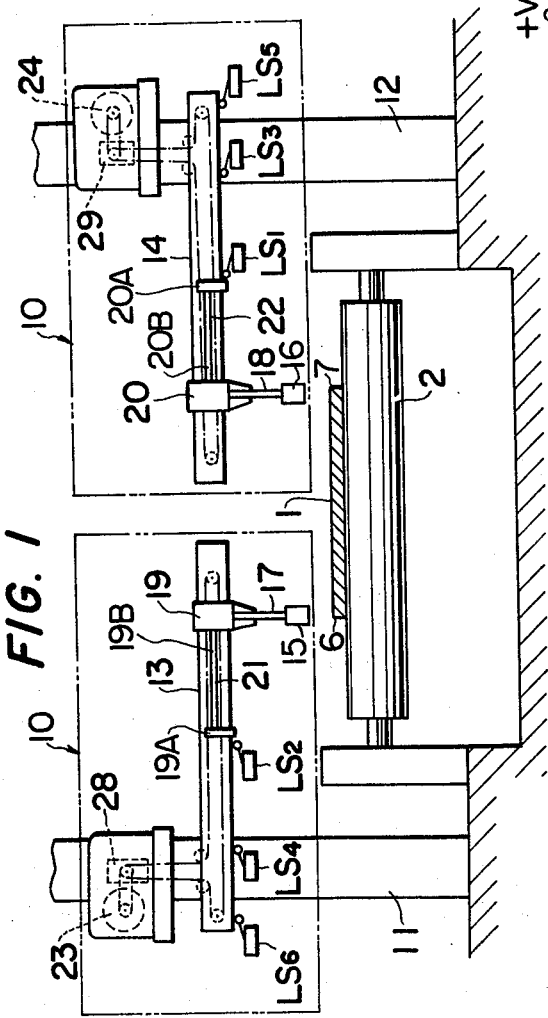
FIG. 1 shows a side view of an apparatus according to the present invention.
Figure 2:
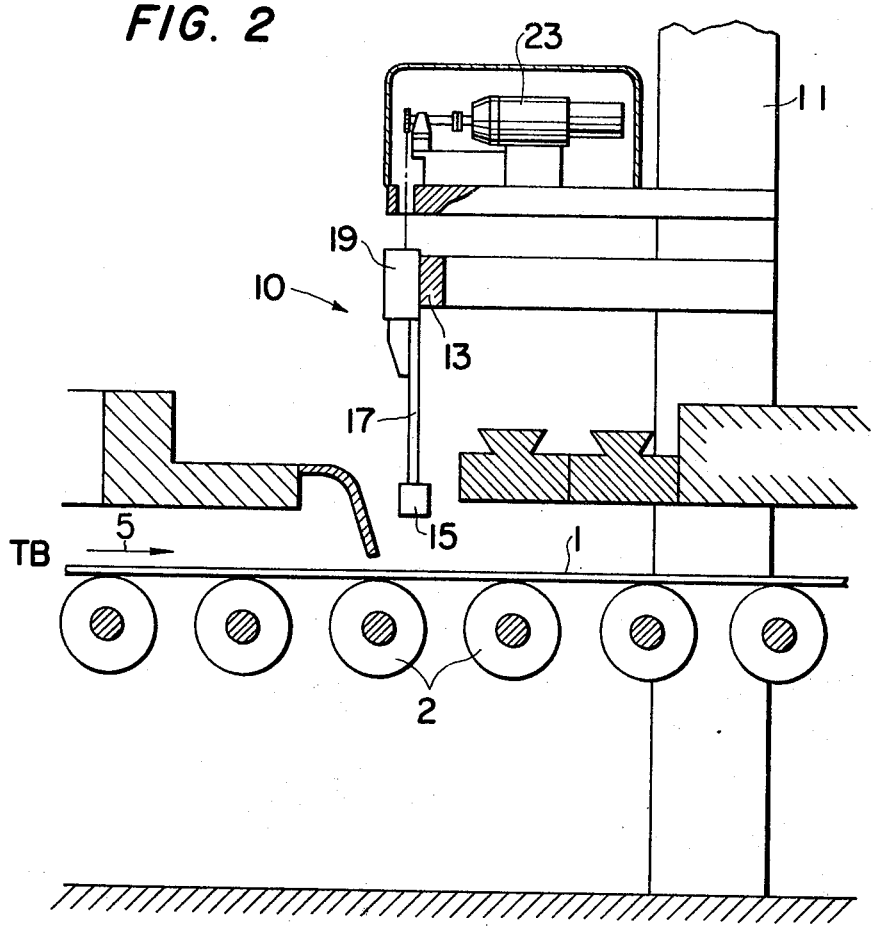
FIG. 2 is another side view of the FIG. 1 apparatus taken along the line 3—3 of FIG. 1 locking in the direction of the arrows.

Reference is made to FIGS. 1 and 2, wherein there is shown an apparatus 10 in accordance with the present invention to generate an electrical signal representing a width of a glass ribbon 1 while it is carried on a roller conveyor 2. It is well known that in manufacturing a plate glass, molten glass is poured through an orifice of a furnace (not shown) on a molten tin which is confined in a container (not shown) called a tin bath. The poured molten glass spreads over the molten metal to form a continuous molten glass sheet or a glass ribbon 1. The glass ribbon 1 is then transferred by the roller conveyor 2 in a direction indicated by an arrow 5 to a next stage such as a lehr or an annealing oven (not shown). The apparatus 10 is positioned in the vicinity of the tin bath, through the tin bath is not shown in the drawings.

As shown in the drawings, the apparatus 10 comprises various members enclosed with dotted lines. It is understood that the apparatus 10 comprises a pair of symmetrical parts provided at both sides of the roller conveyor 2 or the glass ribbon 1, respectively. Therefore, only one of the symmetrical parts will be described hereinafter for the sake of simplicity. A support 11 is provided out of one side of the roller conveyor 2 to fixedly hold a transversal supporting member 13. The supporting member 13 is arranged substantially parallel to the major surfaces of the glass ribbon 1 and in a direction perpendicular to that of the advancement thereof. The supporting member 13 is movably provided with a moving box 19 which is connected to an endless chain or belt 21. The endless chain 21 is in turn rotatably connected to a motor 23 to move the moving box 19 along the supporting member 13. As shown, the moving box 19 hangs detecting means 15 through a suitable hanging member 17. The detecting means 15 therefore can be horizontally moved, due to the rotation of the motor 23, toward or away from a vertical plane containing a center line of the roller conveyor 2. The detecting means 15 comprises a light-emitting and a photo-sensitive elements wherein the former emits a light beam downward and the latter received it which is reflected on a roller surface of the roller conveyor 2 or at an edge 6 of the glass ribbon 1. Therefore, the detecting means 15 can detect whether or not the edge 6 is under the detecting means 15 by checking the variation of intensity of the light beam entering the photosensitive element, because the detecting means 15 moves from the left hand to the right in FIG. 1 in detecting operation. As shown, the supporting member 13 is further provided with three electrical switches LS2, LS4, and LS6 which are closed or opened by a sliding member 19A while the moving box 19 moves along the supporting member 13, since the sliding member 19A is interlocked with the moving box 19 through a suitable connector 19B. The switch LS4 is closed to energize or switch on the detecting means 15 when the detecting means 15 moves rightward in excess of a preselected point. Therefore, the detecting means 15 is ready for the detecting operation. On the contrary, the switch LS4 is opened to deenergize the detecting means 15 when the latter passes the preselected point from the right hand to the left. Whilst, the switch LS2 is closed to actuate an alarm device in case the detecting means 15 fails to detect the edge 6 to continue advancing rightward. On the other hand, the switch LS6 is employed to stop the motor 23 by reversing its switching condition when the detecting means 15 reaches the most leftward position previously determined by the manufacturer or the operator. A reference numeral 28 denotes a potentiometer, the contact points of which is interlocked with the endless chain 21. Consequently, the potentiometer 28 generates an electrical signal representing the moving distance of the detecting means 15. As previously mentioned, in the above description, only one of the pair of the symmetrical parts of the apparatus 10 has been illustrated. It is understood that the reference numerals or characters 11, 13, 15, 17, 19, 19A, 19B, 21, 23, 28, LS2, LS4, and LS6 correspond to 12, 14, 16, 20, 20A, 20B, 22, 24, 29, LS1, LS3, and LS5, respectively.

Figure 3A:
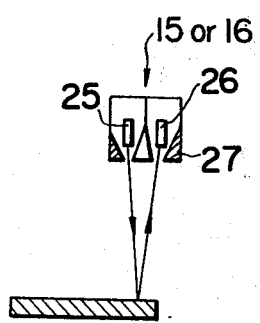
FIG. 3(A) shows schematically a side view of detecting means used in the FIG. 1 apparatus.
Figure 3B:
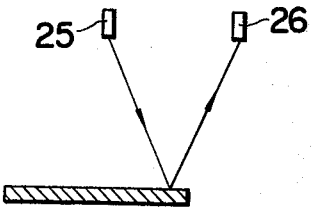
FIG. 3(B) is a variation of the detecting means of FIG. 3(A)

Reference is made to FIGS. 3(A) and (B), wherein the detecting means 15 and 16 are schematically illustrated. Reference numerals 25 and 26 denote the light-emitting and the photo-sensitive elements, respectively. In FIG. 3(A), these elements 25 and 26 are installed in a case 27, whilst, in FIG. 3(B), they are arranged separate. As previously mentioned, the apparatus is positioned in the vicinity of the tin bath so that the glass ribbon 1 is still of considerably high temperature. Therefore, the detecting means 15 and 16 are positioned in an atmosphere of a high temperature. Consequently, to avoid undesirable affect to the detecting means 15 and 16, the case 27 is cooled by water and the detecting means 15 and 16 are moved outwards immediately after they complete the detection of the edges 6 and 7.

In manufacturing a plate glass by means of a so-called floating method, hydrogen gas is constantly blowed into the tin bath in order to prevent oxdization of the molten tin. The hydrogen gas combined with oxygen in the air and burns near the exit of the bath. The light due to the burn of the hydrogen gas enters the photo-sensitive element 26 to adversely affect to the detection of the edges 6 and 7. To avoid this shortcoming, according to the present invention, gas light emitting diodes (ded) are employed as the elements 25 and light filters are attached to the photo-sensitive elements 26. The gas diodes emits a light beam with wavelength of from 0.9–1.0 micron meters and intermitted at the rate of 2500 per second, and the light filter serves to allow only the light beam with such wavelength to enter the photo-sensitive element 26.

Reference is made to FIG. 4, wherein there is illustrated schematically in a block diagram how the apparatus 10 operates. A delay circuit 31, when it receives signal S5 from an end gate G7, generates automatically a trigger signal S1 after a predetermined time period. The trigger signal S1 thus generated is fed to an or gate G1. As shown, the one of the two input terminals of the or gate G1 is connected to a manual starting unit (not shown) to receive manual instructions therefrom for initiating single or repeated operations of the apparatus 10. The output of the or gate G1 is then fed to two and gates G2 and G3 to which output terminals of the switches LS5 and LS6 are electrically connected, respectively. The switches LS5 and are in closed switching conditions when the detecting means 15 and 16 are positioned such that the sliding members 19A and 20A close the switches LS5 and LS6. Such positions where the detecting means 15 and LS6 are situated as above are hereinafter referred to initial positions, respectively. If the detecting means 15 and 16 are situated at the above mentioned initial positions, the switches LS5 and LS6 develop signals S2 and S3 to feed them to the and gates G2 and G3, respectively. Once the and gates G2 and G3 receive simultaneously the signal from the or gate G1 and the signals S2 and S3, they generate signals to actuate the mtor 23 and 24 as indicated by reference numerals 30 and 32. Then, the both of the detecting means 15 and 16 begin to advance inwards. When the detecting means 15 and 16 moves predetermined distances, the switches LS3 and LS4 is closed or switched on (34 and 36) to energize the detecting means 15 and 16 (38 and 40), so that the light-emitting elements 25 in FIG. 3 begin to emit light beams downwards. Thus, the detecting means 15 and 16 continue to move further inward until they detect the side edges 6 and 7 of the glass ribbon (42 and 44). The detection of the side edges are achieved by checking the variation of intensity of the light beam entering the photo-sensitive element 26. Upon detection of the side edges by the detecting means 15 and 16, the motor 23 and 24 stop (46 and 48) to cause suitable signal generating devices (not shown) to develop signals which represent that the motors 23 and 24 stop. The signals thus developed are separately fed to an and gate G5 which generate another signal upon receiving the above two signals at the same time. The output from the and gate G5 is fed to a calculator 50 to begin to generate an electrical signal representing the width of the glass ribbon 1. The calculator 50 receives three kinds of signals L1, L2, and L0 from the potentiometers 28 and 29. The signal L1 and L2 represent respectively moving distances of the detecting means 15 and 16 from their initial positions to the points where they stop upon detecting the side edges 6 and 7. Whereas, the signal L0 represents the distance between the initial positions of the detecting means 15 and 16 the calculator 50, after receiving the above three kinds of signals L1, L2, and L0, begins to calculate the width of the ribbon 1 by using the following equation.

$$W\ L0 - L1 - L2$$

Where W: An electrical signal indicative of the width of the glass ribbon 1.

The signal W is then transferred to an indicator 52 to be stored in a suitable memory (not shown) incorporated therein and then to be converted into visible information by means of a suitable indicating medium such as an electric meter or recording paper, etc. The signal W remains in the memory until the indicator 52 receives erase instructions which is supplied from the delay circuit 31 at every beginning of the operations of the apparatus 10. After the signal W is stored in the memory, the indicator 52 develops a signal S4, which is fed through an or gate G6 to an electrical circuit 54. The circuit 54 receives the signal S4 and then reverses the motors 23 and 24. As a consequence, the detecting means 15 and 16 begin to move outward (56 and 58) to close the switches LS5 and LS6 (60 and 62) upon reaching the initial positions. Then, the switches LS5 and LS6 develop the signals S1 and S2 which are fed to motors 23 and 24 to stop them (64 and 66) and also fed to the and gates G2 and G3 as previously mentioned. The motors 23 and 24 then stop at the initial positions to apply signals to an and gate G7 which in turn instructs the delay circuit 31 to generate the signal S1 after a predetermined time interval. Thus, the apparatus 10 carries out the same process as the above.

In the above, provided that the width of the glass ribbon 1 is excessively narrow or the detecting means 15 and 16 fail to detect the side edges 6 and 7 to move inward more than a predetermined distance, the switches LS1 and LS2 and closed (70 and 72). Once the switches LS1 and LS2 are closed, the motors 23 and 24 are forced to stop by instructions from an or gate G4. Then, the motors 23 and 24 generate a signal S8 which is fed to an alarm 34 and also to the or gate G6 to reverse the motors 23 and 24 moved back to the initial positions.

Figure 5:
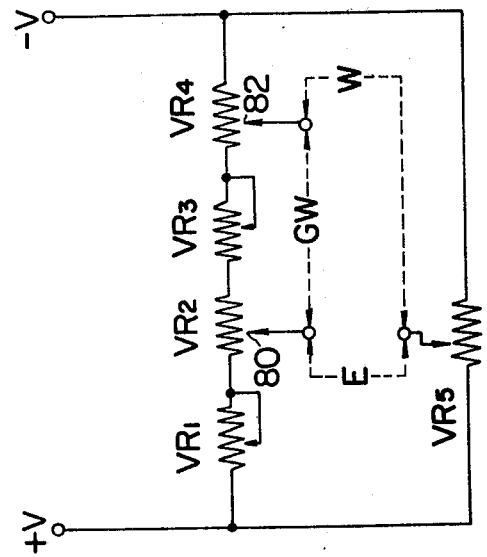
FIG. 5 shows an electrical circuit employed in the FIG. 1 apparatus.

Reference is now made to FIG. 5, wherein there is illustrated an electrical circuit according to the present invention to generate the electrical signal representing the width of the glass ribbon 1. As shown, five variable resistors VR1–VR5 are connected between positive and negative terminals of a power source (not shown). The VR2 and VR4 correspond to the potentiometers 28 and 29 respectively and their contact points 80 and 82 are connected to the endless chains 21 and 22 to move in proportional to the movements of the detecting means 15 and 16. The VR1 is employed for regulating an electric current flowing through the VR2 and VR4 in accordance with the span of the glass ribbon 1. Whilst, the VR5 is employed to make potentials E and W equal when the detecting means 15 and 16 are situated at the initial positions. Therefore, if the difference between the potentials E and W is determined when the detecting means 15 and 16 stop upon detecting the side edges 6 and 7, we can know a deviation of the center line of the glass ribbon 1 with respect to that of the roller conveyor 2. A potential GW between the contacts points 80 and 82 represent the distance between the initial positions if the detecting means 15 and 16 are situated at the most outward positions of their movable ranges determined by the operator or the manufacturer, respectively. It is apparent that the GW at the above condition of the detecting means 15 and 16 corresponds to the signal L0. On the other hand, the L1 and L2 correspond to the potential differences derived from the contact points 80 and 82 while the detecting means 15 and 16 start and stop upon detecting the side edges 6 and 7. However, it is understood that the signal representing the width of the glass ribbon 1 corresponds to the potential GW when the detecting means 15 and 16 stop upon detecting the side edges 6 and 7.

From the above description, according to the present invention, the measurement of the width of the glass ribbon can be carried out automatically, precisely, and easily. Therefore, it is very advantageous to employ the apparatus 10 for the purpose of production control in plate glass manufacturing process.

I claim:
1. Apparatus for use in plate glass manufacturing, which generates an electrical signal representing a width of a glass ribbon while it is carried on a roller conveyor, comprising:
two detecting means being movable in a horizontal plane parallel to the major surfaces of said glass ribbon and in the direction perpendicular to that of the advancement thereof and adapted to detect side edges of said glass ribbon, said two detecting means initially situated at positions out of said side edges respectively to avoid undesirable affect of a high temperature atmosphere due to said glass ribbon and then moving toward a vertical plane involving a center line of said roller conveyor to detect said side edges respectively, said two detecting means each comprising an integral combination of a light-emitting element to emit a light beam therefrom and a photo-sensitive element, said photo-sensitive element receiving said light beam which is reflected by one of said side edges when the detecting means is brought above one of said side edges;

two moving means moving said two detecting means and stopping them when said two detecting means detect said side edges, respectively, and said two moving means each including a supporting member movably supporting the corresponding detecting means, an electric motor, an endless chain rotatably connected to said electric motor to move the corresponding detecting means attached thereto: and signal generating means generating an electrical signal indicative of distance between said two detecting means, so that said glass ribbon can be represented by said electrical signal when said two detecting means are forced to stop upon detecting said side edges, respectively, and then said two moving means moving said detecting means to their initial positions immediately after detecting distance between said two detecting means, and said signal generating means including at least two variable resistors, each resistance of which varies in proportion to the rotating distance of the corresponding endless chain.

2. Apparatus for use in plate glass manufacturing according to claim 1, wherein three electrical switches are attached to said supporting member in such a way as to reverse their switching conditions according to the movement of the corresponding moving means, the first switch of said three electrical switches being closed to energized the corresponding detecting means when the corresponding detecting means moves toward said vertical plane in excess of a predetermined point, the second switch of said three electrical switches being opened to de-energized said electric motor for stopping the corresponding detecting means when the corresponding detecting means moves toward said vertical plane in excess of the other predetermined point, and the third switch of said three electric switches being opened to de-energized said electric motor when the corresponding detecting means reaches its initially situated position.

* * * * *